United States Patent [19]

Kuzavkov et al.

[11] 3,988,203

[45] Oct. 26, 1976

[54] CONTROL ASSEMBLY OF A NUCLEAR REACTOR

[76] Inventors: Nikolai Grigorievich Kuzavkov, ulitsa Strazh Revoljustsii, 28, kv. 16; Vladimir Vasilievich Pakhomov, ulitsa Shalyapina, 19, kv. 12; Ivan Ivanovich Prin, ulitsa Sovnarkomovskaya, 30, kv. 106; Alexandr Sergeevich Shabalin, ulitsa Strazh Revoljutsii 28, kv. 20, all of Gorky, U.S.S.R.

[22] Filed: May 10, 1974

[21] Appl. No.: 469,030

[30] Foreign Application Priority Data

May 14, 1973 U.S.S.R. ............................ 1916242

[52] U.S. Cl. ............................ 176/86 R; 176/36 R
[51] Int. Cl.² .......................................... G21C 7/08
[58] Field of Search .................. 176/76 R, 35, 86 R

[56] References Cited
UNITED STATES PATENTS

| | | | |
|---|---|---|---|
| 3,121,045 | 2/1964 | Harris et al. | 176/86 R |
| 3,194,740 | 7/1965 | Frisch | 176/86 R |
| 3,462,345 | 8/1969 | Jabsen | 176/36 R |
| 3,481,833 | 12/1969 | Germond et al. | 176/86 R |
| 3,575,804 | 4/1971 | Ripley | 176/36 R |
| 3,660,231 | 5/1972 | Fox et al. | 176/86 R |
| 3,746,615 | 7/1973 | Rottger et al. | 176/36 R |
| 3,773,617 | 11/1973 | Marmonier et al. | 176/86 R |

*Primary Examiner*—Harvey E. Behrend
*Attorney, Agent, or Firm*—Holman & Stern

[57] ABSTRACT

The control assembly of a nuclear reactor according to the invention comprises a sleeve stationarily mounted in the fuel core of the reactor and accommodating a casing movable therein. The casing accommodates two superposed concentric sections formed by fuel and absorbing elements, respectively. Approximately at the boundary between the sections, the casing is provided with openings adapted to remove a part of a cooling medium flowing around said sections and into a space formed between the casing and sleeve. In order to control the flow rate of this part of the cooling medium, depending on the position of the casing relative to the fuel core of the reactor, a throttle means disposed in the zone of the section formed by the absorbing elements is provided.

2 Claims, 3 Drawing Figures

CONTROL ASSEMBLY OF A NUCLEAR REACTOR

The present invention relates to nuclear reactors, and more particularly to a control assembly of a nuclear reactor mainly to be used in fast nuclear reactors.

A control assembly of a nuclear reactor is known in the art, wherein a casing of the assembly thereof is movable in a sleeve so as to form a space therebetween, with the sleeve being stationarily mounted in the fuel core of the reactor, and with said casing accommodating two concentric vertically superimposed sections formed by fuel and absorbing elements, respectively, which are in contact with a cooling medium.

In the above-described control assembly the fuel and the absorbing elements are cooled with an ascending cooling medium which successively flows around the sections formed by said fuel and absorbing elements, respectively. The flow rate of the cooling medium with such construction of the assembly is constant and is calculated so as to remove heat from the fuel elements when located within the fuel core. For that reason, during the period of the reactor starting operation, when the absorbing elements are mounted within the fuel core, and when the heat release of the absorbing elements is lower than that of the fuel elements, a considerable underheating of cooling medium flowing through the control assembly occurs. This results in the reduction of the temperature of the cooling medium at the output of the reactor, and hence causes a lower thermal efficiency thereof.

It is therefore an object of the present invention to provide a control assembly for a nuclear reactor which enables continuous control of the flow rate of the cooling medium through the sections thereof depending on the heat release of the sections, wherein the casing of the control assembly may be moved relative to the fuel core of the nuclear reactor.

The above object is accomplished due to the fact that in the control assembly of the nuclear reactor having a casing accommodated in a stationarily mounted sleeve in the fuel core of the reactor so as to form a space therebetween, said casing accommodating two concentric vertically superimposed sections formed by fuel and absorbing elements, respectively, which is contacted with a cooling medium, and according to the invention the casing is provided with at least one opening located approximately at the boundary between said sections, said opening providing a mean for the removal of a part of the cooling medium from the casing and into the space between the latter and the sleeve with, the zone of the section formed by the absorbing elements having a throttle means providing for the control of the flow rate of cooling medium flowing through said space depending on the position of the casing relative to the fuel core of the reactor.

The throttle means preferably comprises projections on the outer surface of the casing.

The control assembly of a nuclear reactor according to the invention ensures an appropriate increase in the temperature during the output of the reactor thereby imparting the thermal efficiency to the nuclear reactor.

The invention will now be described with reference to a specific embodiment thereof illustrated in the accompanying drawings, in which:

FIG. 1 schematically shows a longitudinal section of a control assembly of a nuclear reactor according to the invention with the components of the plenum chamber of the reactor;

Figure 3:
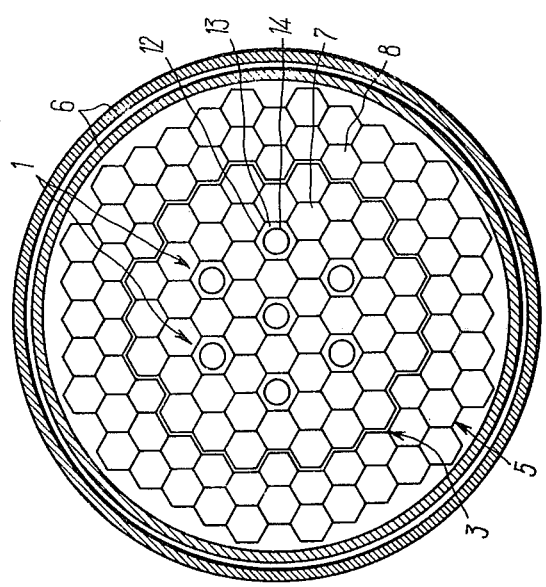
FIG. 3 is a view taken along the line II—II in FIG. 2.

The control assembly 1 according to the invention (FIG. 1) of a nuclear reactor 2 (FIG. 2) is adapted to compensate for the reactivity during the burning-out of fuel phase during the operation of the nuclear reactor, which in the example described herein is a fast reactor using liquid sodium as cooling medium. The control assembly 1 (FIG. 1) is accommodated in a fuel core 3 (FIG. 2) of the reactor 2 surrounded by end and lateral blanket regions 4 and 5, respectively, as well as by a neutron shielding 6. Fuel assemblies 7 (FIG. 3) of the fuel core 3 and fuel assemblies 8 of the lateral blanket region 5 are fixed to the top and bottom plates 9 and 10 (FIG. 2), respectively, of a plenum chamber 11 of the reactor 2, to which sleeves 12 (FIG. 1) of the control assembly 1 is also fixed.

Each sleeve 12 having a space 13 accommodates, a casing 14 of the control assembly 1 movable therein, said casing accommodating vertically superposed sections 15 and 16 formed by the fuel and absorbing elements, respectively. In the embodiment described herein the section 15 is disposed in the bottom part of the casing 14. The fuel elements of the section 15 are mounted in a spaced relation to each other and are fixed to a metallic grate 17 disposed in the bottom part of the casing 14, and the absorbing elements of the section 16 are mounted similarly with respect to the fuel elements and fixed to a metallic grate 18 secured to the intermediate portion of the casing 14. Six openings 19 are made in the intermediate portion of the casing 14 at the boundary between said sections 15 and 16 (only three openings may be seen on the sectional view of the control assembly shown in FIG. 1), with the openings being adapted to remove a part of cooling medium from the casing 14 and into the space 13.

In the embodiment of the control assembly 1 described herein the cooling medium provenient from the plenum chamber 11 (FIG. 2) successively flows around the fuel and absorbing elements 15 of the sections 15 (FIG. 1) and 16, as well as around the casing 14 proper of the control assembly 1. For that purpose, openings 20 are provided in the bottom part of the sleeve 12 to ensure the flow of cooling medium around the casing 14 through the space 13, while the bottom end face of the casing 14 is provided with an opening 21. As shown by arrows on the drawing, a part of cooling medium flows into the casing 14, and then, through openings 22 the bottom grate 17, into the spaces between the fuel elements of the section 15. Then a part of the cooling medium flows through openings 23 of the grate 18 and is discharged from the casing 14 through openings 24. At the same time, the other part of the cooling medium is removed through the openings 19 and introduced into the space 13 between the sleeve 12 and the casing 14.

In the top portion of the casing 14, in the section 16 formed by the absorbing elements, a throttle means 25 is disposed therein providing the control of the flow rate of the cooling medium flowing through the space 13 depending on the position of the casing 14 relative to the fuel core 3 (FIG. 2) of the nuclear reactor 2. In the embodiment described herein the throttle means 25 (FIG. 1) comprises annular rectangular projections 26 on the outer surface of the casing 14.

Figure 1:
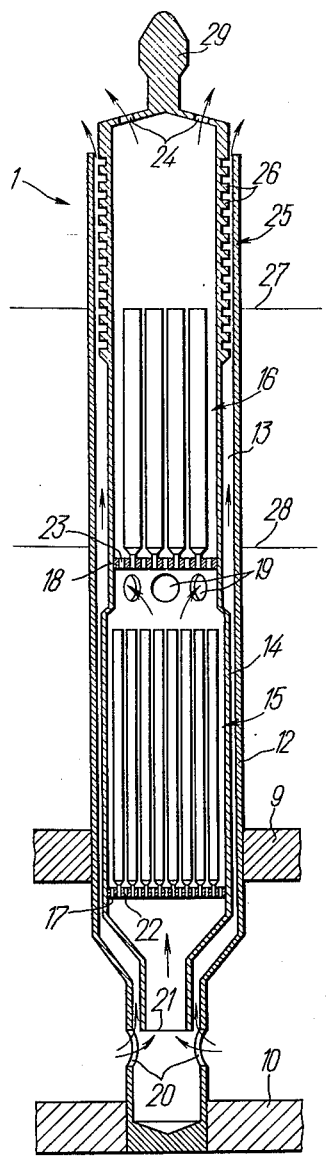

Other design embodiments of the control assembly of a nuclear reactor are possible, wherein the throttle means may comprise a triangular, trapezoidal, or the like projections on the outer surface of the casing, as well as a smooth variable-section slot defined by the outer surface of the casing and the inner surface of the sleeve. The arrangement of the projections on the outer surface of the casing, or the shape of the smooth slot between the casing and the sleeve are selected depending on the desired relationship of the flow rate of the cooling medium through the control assembly vs. the position thereof relative to the fuel core. The relationship defining the variation of the flow rate of the cooling medium through the control assembly 1 (FIG. 1) is, in turn, determined by the character of the variation of the heat released in the sections 15 and 16 depending on the position of the control assembly 1 relative to said fuel core. FIG. 1 shows the position of the control assembly 1 for the starting period of the operation of the reactor 2, when the absorbing elements of the section 16 are within the limits of the upper and lower boundaries 27, 28, respectively, of the fuel core 3 (FIG. 2) of the reactor 2.

In order to reduce the hydraulic restriction of the space 13 (FIG. 1) at the output of the cooling medium flow from the openings 19, the casing 14 is thus of a smaller diameter in this zone as compared to that in the zone of the section 15 formed by the fuel elements.

In order to provide for the displacement of the control assembly 1 relative to the fuel core 3 (FIG. 2), the top portion of the casing 14 (FIG. 1) has a head 29 which is adapted to cooperate with a rod or rods 30 (FIG. 2) of a drive 31. The drives 31 are disposed on a cover plate 32 of a housing 33 of the reactor 2.

Cooling medium is supplied to and discharged from the housing 33 of the reactor 2 by means of supply and discharge socket pipes 34 and 35, respectively.

The control assembly of a nuclear reactor according to the invention operates as follows.

Figure 2:
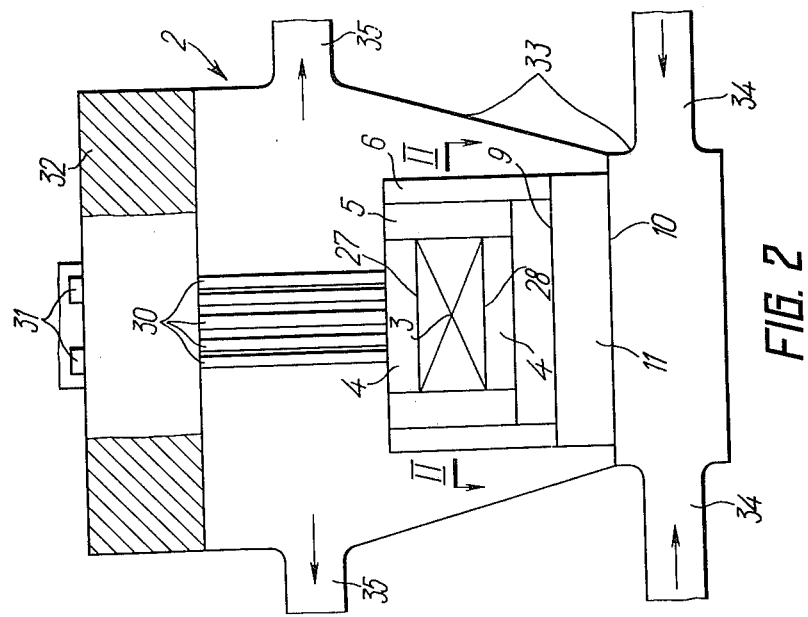
FIG. 2 is a longitudinal section of a nuclear reactor with control assembly according to the invention.

During the starting period for the operation of the nuclear reactor 2 (FIG. 2) the control assemblies 1 (FIG. 1) are installed in such a manner that the absorbing elements of the section 16 are disposed within the limits of the upper and lower boundaries 27 and 28 of the fuel core 3 (FIG. 2), respectively, so as to compensate for the resource of burning out reactivity fuel in the fuel assemblies 7 (FIG. 5) of the fuel core 3. In this position the heat release of the fuel elements of the section 15 (FIG. 1) is at its minimum, and the heat release in the absorbing elements of the section 16 is at its maximum during the entire period of the operation of the reactor 2. (FIG. 2). However, the maximum heat release of the absorbing elements of the section 16 (FIG. 1) is substantially lower than the maximum heat release of the fuel elements of the section 15. Therefore, in the above-described position of the control assembly 1, the flow rate of cooling medium therethrough is at its minimum.

The flow of cooling medium provenient from the plenum chamber 11 (FIG. 2) passes through the openings 20 (FIG. 1) of the sleeve 12 and into the sleeve 12. The main part of this flow is admitted into the casing 14 through the opening 21 in the end face thereof, and then, after having passed through the openings 22 of the grate 17, flows around the fuel elements of the section 15 to remove heat therefrom. A smaller part of the cooling medium which has passed into the sleeve 12 flows through the space 13 between the sleeve and the casing 14.

The flow of cooling medium leaving the section 15 is fed, through the openings 23 of the grate 18, to the absorbing elements of the section 16 and flows around them to remove heat therefrom. The heat cooling medium is fed, through the openings 24 of the casing 14, into the discharge socket pipes 35 (FIG. 2) to be discharged therethrough from the reactor 2. A negligeable part of the flow of the cooling medium leaving the section 15 (FIG. 1) is fed through the openings 19 of the casing 14 into the space 13 and flows through the throttle means 25 to be discharged from the reactor 2 through the socket pipes 35 (FIG. 2).

Since in this position of the control assembly 1 (FIG. 1) all the projections 26 of the throttle means 25 are received in the sleeve 12, the hydraulic restriction of the throttle means 25 is at its maximum, and the flow rate of the cooling medium through the space 13 is very small. At the same time, the flow rate of the cooling medium through the control assembly as a whole depends, in this case, on the throughput section of the openings 24 in the top part of the casing 14.

As the fuel in the fuel assemblies 7 (FIG. 3) of the fuel core 3 is burned-out, the resources for reactivity in the reactor 2 (FIG. 2) decreases. In order to compensate for the decrease in the reactivity of the reactor 2, the control assemblies 1 (FIG. 1) are displaced vertically upwards by means of the rods 30 (FIG. 2) and the drives 31. In so doing the absorbing elements of the section 16 (FIG. 1) are withdrawn from the fuel core 3 (FIG. 2) of the reactor 2, and the fuel elements of the section 15 (FIG. 1) are introduced into the fuel core. As the fuel elements are introduced into the fuel core 3 (FIG. 2) the heat release in these elements grows greater, while the heat release in the absorbing elements of the section 16 (FIG. 1) respectively decreases.

As the fuel elements are driven in, the projections 26 of the throttle means 25 are partially withdrawn from the sleeve 12, so that the hydraulic restriction of the throttle means 25 becomes lower, and the flow rate of cooling medium through the space 13 between the sleeve 12 and the casing 14 grows greater, whereby the flow rate of cooling medium flowing through the section 15 is increased.

Due to the fact that an increase in the flow rate of the cooling medium through the section 15 results in a growth of the pressure therein, whereas the total pressure drop across the sections 15 and 16 remains unchanged, and the pressure drop across the section 16 decreases. Therefore, the flow rate of the cooling medium through the section 16 also decreases.

At the end of the operation of the reactor 2 (FIG. 2) the fuel elements of the section 15 (FIG. 1) are disposed within the limits of the upper and lower boundaries 27 and 28 of the fuel core 3 (FIG. 2), so that the heat release therein is at its maximum. In this position all the projections 26 (FIG. 1) are withdrawn from the sleeve 12 so that the hydraulic restriction of the throttle means 25 is minimized. Therefore, the flow rate of cooling medium through the section 15 is at its maximum, and the flow rate through the section 16 is at its minimum.

The control assembly of a nuclear reactor according to the invention provides for constant temperature of the cooling medium at the output thereof during the entire period of the operation of the nuclear reactor by simple means, thereby improving the thermal efficiency of the reactor.

What is claimed is:

1. In a nuclear reactor having a fuel core, a control assembly, and a coolant comprising: a guide sleeve fixedly mounted in said fuel core and having an inlet and an outlet for circulating coolant; a casing arranged coaxially in said guide sleeve and movable telescopically therein, and having an inlet and an outlet for circulating coolant; a space defined between said casing and said guide sleeve; two vertically superposed sections in said casing; fuel elements forming said first section; absorbing elements forming said second section; at least one opening in the casing approximately at the boundary between said sections, said opening providing for the removal of part of said coolant from said casing into said space between the casing and the guide sleeve; and throttle means on said casing in said space between the casing and the guide sleeve in the zone of said second section formed by absorbing elements, said throttle means being movable with said casing, said throttle means providing full throttling when said throttle means is completely within said guide sleeve and providing less throttling when it is partially withdrawn from said guide sleeve into a region above said outlet said throttle means ensuring control of the flow of said coolant through said space depending on the position of said casing relative to said fuel core.

2. The control assembly according to claim 1, wherein said throttle means is made in the form of projections on the outer surface of said casing.

* * * * *